April 10, 1928. Re. 16,930

F. C. WISE ET AL

FLINT LIGHTER

Original Filed April 14, 1925

FREDERICK CHARLES WISE
WILLEY GREENWOOD

INVENTOR

BY Otto Munk their ATTORNEY.

Reissued Apr. 10, 1928. Re. 16,930

UNITED STATES PATENT OFFICE.

FREDERICK CHARLES WISE AND WILLEY GREENWOOD, OF LONDON, ENGLAND, ASSIGNORS TO ALFRED DUNHILL OF LONDON, INC., OF NEW YORK, N. Y., A CORPORATION OF DELAWARE.

FLINT LIGHTER.

Original No. 1,550,859, dated August 25, 1925, Serial No. 23,160, filed April 14, 1925. Application for reissue filed June 30, 1927. Serial No. 202,730.

This invention relates to flint lighters of the kind in which a flint carrier, a wick tube, a pivoted arm carrying a closing cap for the end of said tube, and a spring which controls said arm, are arranged in an exposed position on the top of a flat fuel container.

The principal object of the invention is to provide means, in the case of lighters which are plated or made of precious metal, for rendering inconspicuous and protecting from rust, the blade spring which controls the pivoted arm, and the invention consists in this respect in covering the original steel spring by an additional spring made of non-corrosive metal.

Another object of the invention is to provide inconspicuous means for storing flint re-fills, for which purpose the fuel container is, according to the invention, fitted with a screw stopper having an inwardly directed prolongation in the form of a detachable barrel adapted to take the re-fills.

A third feature of the invention consists in pointing and annealing the ends of the spring which feeds the flint to the abrasive wheel so as not to damage the latter when contacting with the same after the wearing out of the flint.

A still further object of the invention is to so correlate the parts of the lighter which are exposed on the top of the fuel container as to provide a compact and efficiently operating structure which may be readily manipulated with one hand.

Figure 1:
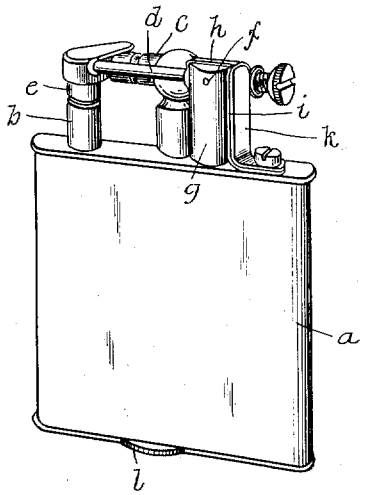

Fig. 1 of the accompanying drawing represents a perspective view of the lighter.

Figure 2:
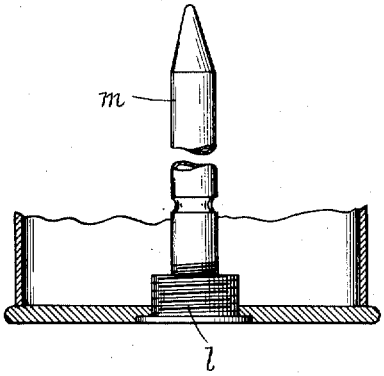

Fig. 2, an incomplete sectional view of the same, and

Figure 3:
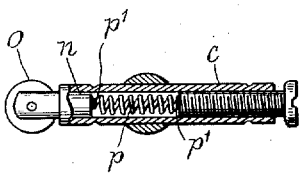

Fig. 3, a sectional top view of the flint barrel.

The lighter comprises a fuel container *a* on top of which are mounted, in an exposed position, a wick tube *b*, parallel to the longitudinal axis of the fuel container *a*, a flint barrel *c*, parallel to the transverse axis of the container *a* and thus perpendicular to the tube *b*, and a pivoted arm *d* which carries a closing cap *e* for the end of the wick tube and a hood *e'* for the abrasive wheel *o* hereinafter referred to. The arm *d* is pivoted at *f* to a pillar *g* by means of a flat tail piece *h* formed with straight edges which are engaged by a steel spring *i* so that the arm will be maintained by the spring either in closed, horizontal position, as shown in Fig. 1, or in an upright, open position when the lighter is in use. The wick tube *b* and the pillar *g* to which the arm *d* is pivoted are adjacent one of the longer edges of the top of the fuel container *a*, while the barrel *c* supported by a post *c'* is adjacent the opposite longer edge of the top of the fuel container. When the lighter is plated or made of precious metal, the steel spring spoils the appearance of the lighter, particularly since it is liable to get rusty. To obviate this drawback, another blade spring *k*, made of non-corrosive metal, for instance the same kind of metal employed in the surrounding elements, is superposed on the spring *i* so as to cover the latter. The spring *k*, while concealing the steel spring, also tends to protect it from rust so that a more durable and reliable article is obtained.

In order to allow the lighter to carry flint re-fills in an inconspicuous manner, the screw stopper *l* which closes the filling aperture of the container *a*, is provided with a prolongation in the form of a barrel *m* which screws into the stopper and which is adapted to receive the re-fills. The barrel *m* is preferably made of substantial length and pointed so that it can be used for distributing the cotton wool within the container.

The flint *n* (Fig. 3) is fed to the abrasive wheel *o* at the end of the flint barrel *c* in proximity to the wick tube *b* by means of a coil spring *p* in the usual manner.

In order to prevent this spring from damaging the wheel *o* when contacting with the latter after the wearing out of the flint, the ends *p'* of the spring are according to the invention somewhat pointed and softened by annealing.

We claim:—

1. In a flint lighter of the character described, the combination with a wick tube, a hood for covering the end of said tube, and a pivoted lever carrying said hood, of a steel spring bearing against said lever so as to hold the hood either in open or closed position, and a blade of non-corrosive metal superposed on said steel spring so as to cover and conceal the same, substantially as and for the purpose set forth.

2. A flint lighter of the character described, comprising a casing constituting in itself a container for directly receiving fuel, said casing having a fuel receiving opening in one of its walls, an exteriorly accessible stopper for said opening, a barrel carried by the stopper, said barrel designed to contain flints and to project a distance into the casing, spark generating means and flame sustaining means on another wall of the casing.

3. A flint lighter of the character described, comprising a casing constituting in itself a container for directly receiving fuel, said casing having a fuel receiving opening in its base, an exteriorly accessible screw stopper for said opening, a barrel removably carried by said stopper, said barrel designed to contain flints and to project a distance into the casing, spark generating means and flame sustaining means on the top of the casing.

FREDERICK CHARLES WISE.
WILLEY GREENWOOD.